H. R. PIERCE & C. J. PILLING.
SPRAYING DEVICE.
APPLICATION FILED APR. 10, 1917.

1,285,788. Patented Nov. 26, 1918.

Inventors:
Harvey R. Pierce
and Charles J. Pilling.
By A. T. Trout
Attorney.

UNITED STATES PATENT OFFICE.

HARVEY R. PIERCE, OF PHILADELPHIA, AND CHARLES J. PILLING, OF LANSDOWNE, PENNSYLVANIA.

SPRAYING DEVICE.

1,285,788. Specification of Letters Patent. Patented Nov. 26, 1918.

Application filed April 10, 1917. Serial No. 161,091.

*To all whom it may concern:*

Be it known that we, HARVEY R. PIERCE, a citizen of the United States, residing in the city and county of Philadelphia, State of Pennsylvania, and CHARLES J. PILLING, a citizen of the United States, residing at Lansdowne, county of Delaware, and State of Pennsylvania, have invented certain new and useful Improvements in Spraying Devices, of which the following is a specification.

The object of our invention is to provide a novel, simple and efficient spraying device for spraying or atomizing material requiring heat to hold it in solution, such as ambrine or any paraffin preparation, the invention being particularly adapted for spraying or atomizing melted ambrine in treating severe burns and abrasions.

With this object in view, our invented device consists of the elements and the combinations of them hereinafter fully described and claimed.

In the accompanying drawings, illustrating our invention:

Figure 1:
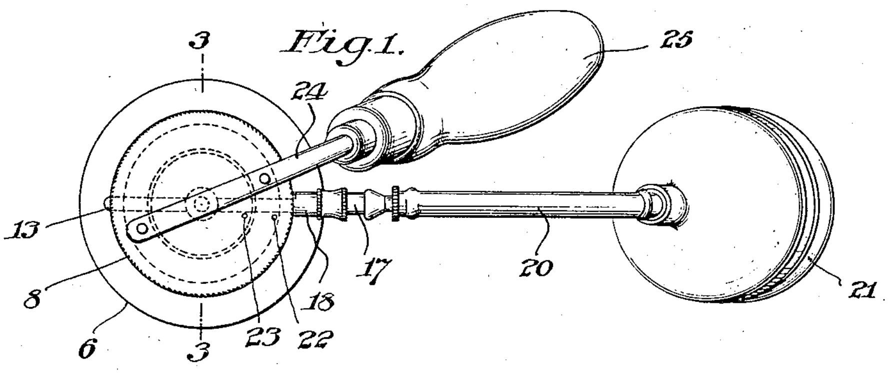
Figure 1 is a top view of our improved spraying device.
Figure 2:
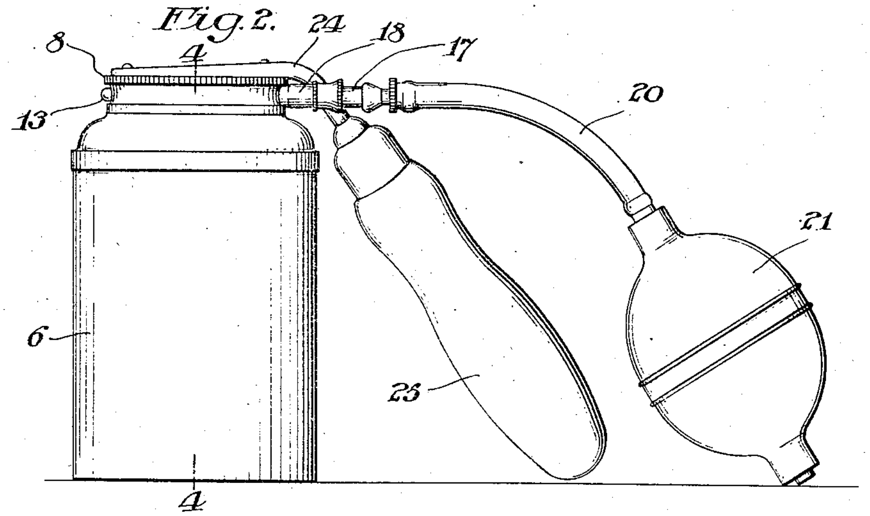
Fig. 2 is a side view thereof.
Figure 3:
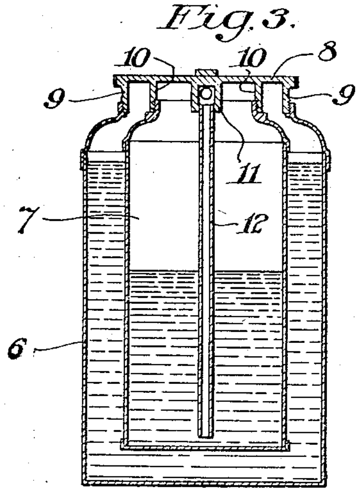
Fig. 3 is a vertical section, on line 3—3 of Fig. 1.

Referring to the drawings, 6 designates an outer vessel, 7 an inner vessel and 8 a head or cap closing the upper ends of the vessels 6 and 7.

The inner vessel 7 is adapted to contain the ambrine or other material to be sprayed, and the inner vessel 7 is spaced from the outer vessel 6, as clearly shown in the drawings.

The outer vessel 6 is adapted to contain hot water within the space between the two vessels to heat the inner vessel 7 and keep it hot to melt the ambrine and hold it in solution or in a liquid state, the ambrine being in solid form under normal temperature.

The head 8 is provided with outer and inner, downwardly-extending, screw-threaded, annular flanges 9 and 10, respectively. The upper end portion of the outer vessel 6 is contracted and screw-threaded and screwed on to the outer flange 9; and the upper end portion of the inner vessel 7 is also contracted and screw-threaded and screwed on to the inner flange 10. It will thus be seen that the head 8 serves as a means to hold the vessels 6 and 7 together in spaced relation to each other, and also serves as a means to close the vessels 6 and 7 to retain heat therein. By unscrewing the outer vessel 6 from the flange 9, the head 8 and inner vessel 7 may be removed as a unit from the outer vessel, and by unscrewing the inner vessel 7 from the flange 10 the head 8 may be removed. Thus access may be readily had to the interiors of the vessels 6 and 7 for filling, cleaning and for other purposes.

We shall not describe the means for atomizing and spraying the heated or liquid ambrine within the inner vessel 7.

Formed on the head 8 and extending downwardly therefrom is a hollow boss 11, and screwed into the lower end of the boss 11 is the upper end of a supply tube 12 which extends down into the inner vessel 7 and has an open lower end arranged a short distance above the bottom of the vessel 7.

Extending horizontally through the flanges 9 and 10 is a discharge tube 13 which is connected at its inner end to the hollow boss 11. The outer end of the tube 13 projects outwardly slightly beyond the outer flange 9 and has a discharge hole 14 therein which is slightly less in diameter than the interior diameter of the tube 13 and from which the ambrine is adapted to be discharged in atomized form or in the form of a spray.

Figure 5:
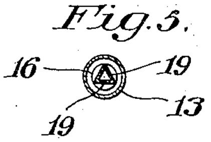
Fig. 5 is an enlarged sectional detail of the device.
Figure 4:
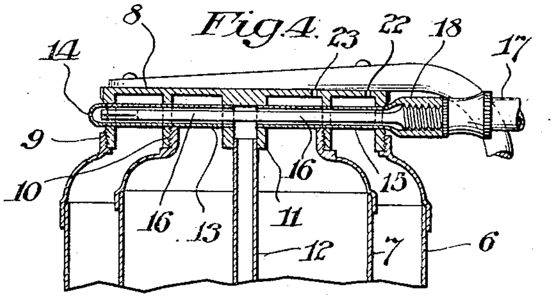
Fig. 4 is a vertical section through the upper portion of the device, enlarged, on line 4—4 of Fig. 2.

Extending through the flanges 9 and 10 is a supplementary tube 15 in axial alinement with, and, in effect, a continuation of the discharge tube 13 and having its inner end connected to the hollow boss 11; and extending through the tube 15 and into the tube 13 to a point near the discharge opening 14 is a long tubular nozzle 16 which projects fixedly from a tubular head 17 which is screwed into the outwardly-projecting enlarged end 18 of the tube 15. The exterior diameter of the tubular nozzle 16 is slightly less than the interior diameter of the tube 13, and the free end portion of the nozzle 16 is provided with flattened side portions 19, as shown in Fig. 5, whereby when compressed air is introduced to the tubular nozzle 16, the compressed air will be discharged from the free end thereof and from the discharge opening 14, drawing air from the tubes 12 and 13 and discharging it through the opening 14, and thereby drawing the liquid ambrine from the inner vessel 7 and discharging it in atomized form from the opening 14.

The tubular head 17 may be connected to any suitable means for supplying compressed air to the nozzle 16. In the drawings we have shown the head 17 connected to one end of a flexible tube 20, the other end of which is connected to a suitable rubber bulb 21 of well known construction and provided with means to supply air under pressure to the nozzle 16 when the bulb 21 is compressed and released in alternate succession in the usual well known manner.

The head 8 is provided with two small vents 22 and 23 which open into the vessels 6 and 7, respectively, to prevent any tendency to form a vacuum within the inner vessel 7 when the ambrine is discharged therefrom and to permit air to escape from the outer vessel 6 when it is screwed on to the flange 9.

As a convenient means to handle and manipulate the device, we secure to the head 8 a projecting arm 24 and provide the same with a suitable handle 25 which we arrange at a convenient angle relatively to the body of the main or outer vessel 6.

In using the device the vessels 6 and 7 are unscrewed from the head 8, the ambrine or other material to be sprayed or atomized is placed within the inner vessel 7 and the inner vessel 7 is screwed on to the head 8. This being done, hot water is placed within the outer vessel 6 in a sufficient quantity to practically fill the space between the two vessels 6 and 7 and the vessel 7 is placed within the vessel 6. The vessel 7 is then placed within the vessel 6 and the vessel 6 is screwed on to the head 8. When desired and when circumstances require it, the ambrine or other material placed within the inner vessel 7 may be suitably heated to a liquid state before the inner vessel 7 is placed within the hot water within the outer vessel 6, so that the inner vessel 7 will have less tendency to cool the hot water when placed therein. After the hot water and ambrine have been introduced to the vessels 6 and 7, respectively, and the vessels 6 and 7 have been screwed on to the head 8, the device is ready for use. The physician or other person now takes hold of the handle 25 with one hand and takes hold of the bulb 21 with the other hand, and operates the bulb as previously explained to cause the liquid ambrine to be drawn up through the tube 12 and discharged from the opening 14 in the tube 13 in atomized form; and while the ambrine is being thus discharged, the physician or other person manipulates the device to direct the atomized ambrine to the part or parts of the patient to be treated.

The heat of the water within the vessel 6 will maintain the ambrine in the proper liquid state to give a uniform spray for a sufficient length of time for the treatment.

We claim:

1. In a spraying device, an inner vessel adapted to contain liquid to be sprayed, an outer vessel surrounding the inner vessel in spaced relation thereto and adapted to contain a heating agent between it and the inner vessel, a removable head covering the inner vessel, a liquid supply tube extending from said head down into the inner vessel, a transversely extending spray discharging tube communicating with said supply tube, said head and said tubes being rigidly connected together, a removable tubular head screwed into a part carried by said removable head, an air nozzle carried by and communicating with said tubular head and discharging into said spray discharging tube, a flexible tube connected to said tubular head, and an air supplying bulb connected to said flexible tube.

2. In a device of the character described, an inner vessel adapted to contain material to be sprayed, an outer vessel surrounding the inner vessel in spaced relation thereto and adapted to contain a heating agent between it and the inner vessel, a head attached to said vessels and holding them together and having a hollow downwardly-extending boss therein, a supply tube connected at its upper end to said boss and extending down into said inner vessel, a discharge tube connected at its inner end to said boss, and means operative to draw liquid from said inner vessel through the first named tube to the second named tube and to discharge it from the second named tube.

3. In a device of the character described, an inner vessel adapted to contain material to be sprayed, an outer vessel surrounding the inner vessel in spaced relation thereto and adapted to contain a heating agent between it and the inner vessel, a head closing said vessels and having a downwardly-extending flange and a downwardly-extending hollow boss, one of said vessels being screwed on to said flange, a supply tube connected at its upper end to said boss and extending down into said inner vessel, a discharge tube penetrating said flange and connected at its inner end to said boss, and means operative to draw liquid from said inner vessel through the first named tube to the second named tube and to discharge it from the second named tube.

4. In a device of the character described, an inner vessel adapted to contain material to be sprayed, an outer vessel surrounding the inner vessel in spaced relation thereto and adapted to contain a heating agent between it and the inner vessel, a head closing said vessels and having two downwardly-extending flanges and a downwardly-extending hollow boss, said vessels being screwed on to said flanges, a supply tube connected at its upper end to said boss and extending down into said inner vessel, a discharge tube penetrating said flanges and connected at its inner end to said boss, and means operative to draw liquid from said inner vessel through the first named tube to the second named tube and to discharge it from the second named tube.

5. In a device of the character described, an inner vessel adapted to contain material to be sprayed, an outer vessel surrounding the inner vessel in spaced relation thereto and adapted to contain a heating agent between it and the inner vessel, a head attached to said vessels and holding them together and having a hollow downwardly-extending boss thereon, a liquid supply tube connected at its upper end to said boss and extending down into said inner vessel, a discharge tube connected at its inner end to said boss, a supplementary tube connected at its inner end to said boss and alined with said discharge tube, and an air discharge nozzle supported by the supplementary tube and extending into the same and into said discharge tube in spaced relation thereto to discharge air under pressure into and from said discharge tube and thereby cause a spray of liquid from the inner vessel to be discharged from said discharge tube.

6. In a device of the character described, an inner vessel adapted to contain material to be sprayed, an outer vessel surrounding the inner vessel in spaced relation thereto and adapted to contain a heating agent between it and the inner vessel, a head closing said vessels and having a downwardly-extending flange and a downwardly-extending hollow boss, one of said vessels being screwed on to said flange, a liquid supply tube connected at its upper end to said boss and extending down into said inner vessel, a discharge tube penetrating said flange and connected at its inner end to said boss, a supplementary tube penetrating said flange and connected at its inner end to said boss and alined with said discharge tube, and an air discharge nozzle supported by the supplementary tube and extending into the same and into said discharge tube in spaced relation thereto to discharge air under pressure into and from said discharge tube and thereby cause a spray of liquid from the inner vessel to be discharged from said discharge tube.

7. In a device of the character described, an inner vessel adapted to contain material to be sprayed, an outer vessel surrounding the inner vessel in spaced relation thereto and adapted to contain a heating agent between it and the inner vessel, a head closing said vessels and having two downwardly-extending flanges and a downwardly-extending hollow boss, said vessels being screwed on to said flanges, a liquid supply tube connected at its upper end to said boss and extending down into said inner vessel, a discharge tube penetrating said flanges and connected at its inner end to said boss, a supplementary tube penetrating said flanges and connected at its inner end to said boss and alined with said discharge tube, and an air discharge nozzle supported by the supplementary tube and extending into the same and into said discharge tube in spaced relation thereto to discharge air under pressure into and from said discharge tube and thereby cause a spray of liquid from the inner vessel to be discharged from said discharge tube.

In testimony whereof we affix our signatures hereto.

HARVEY R. PIERCE.
CHARLES J. PILLING.

Copies of this patent may be obtained for five cents each, by addressing the "Commissioner of Patents. Washington, D. C."